J. LEDWINKA.
RIB FOR AUTOMOBILE BODIES.
APPLICATION FILED FEB. 25, 1913.
1,251,975.
Patented Jan. 1, 1918.
2 SHEETS—SHEET 2.
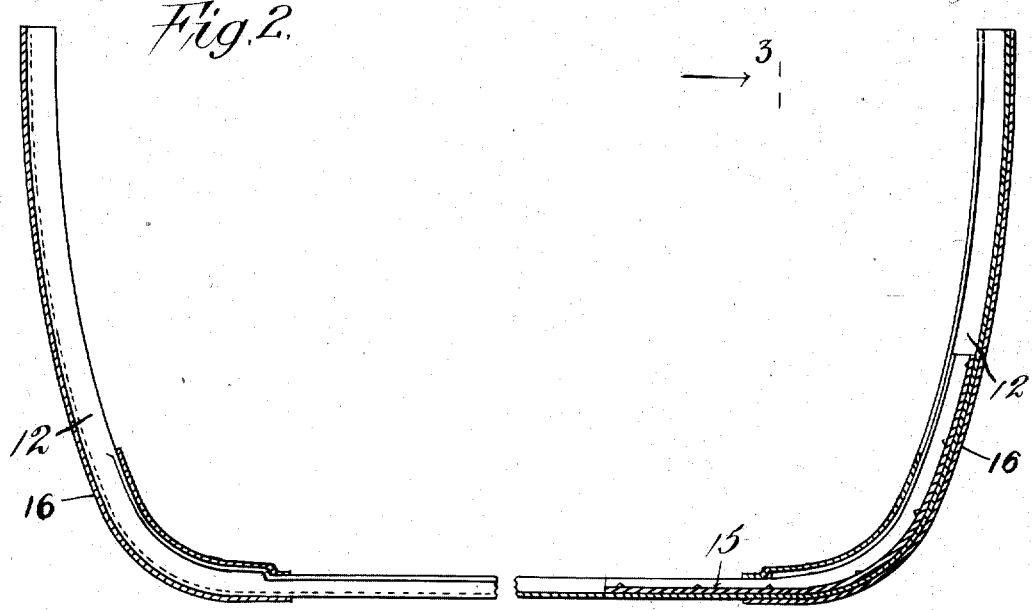
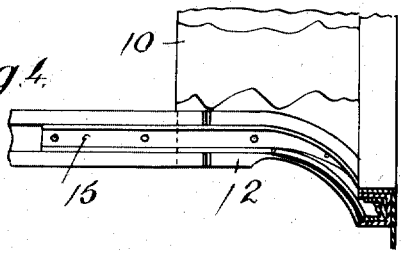
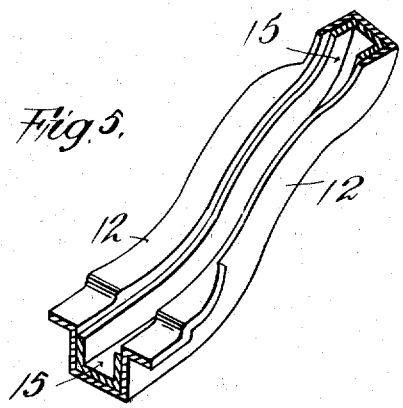
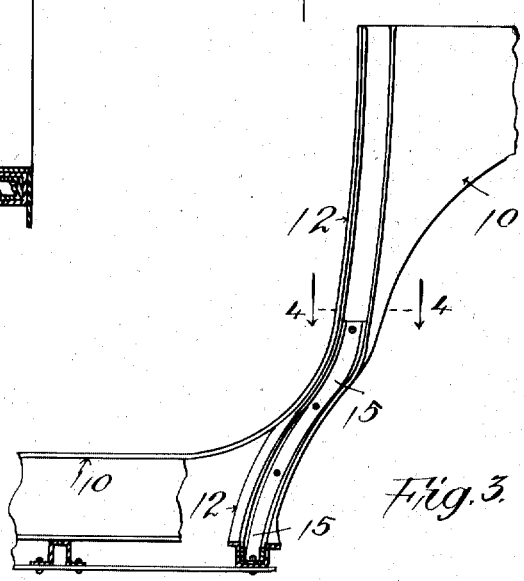
Witnesses:
Inventor
Joseph Ledwinka
By his Attorney
Samuel E. Darby

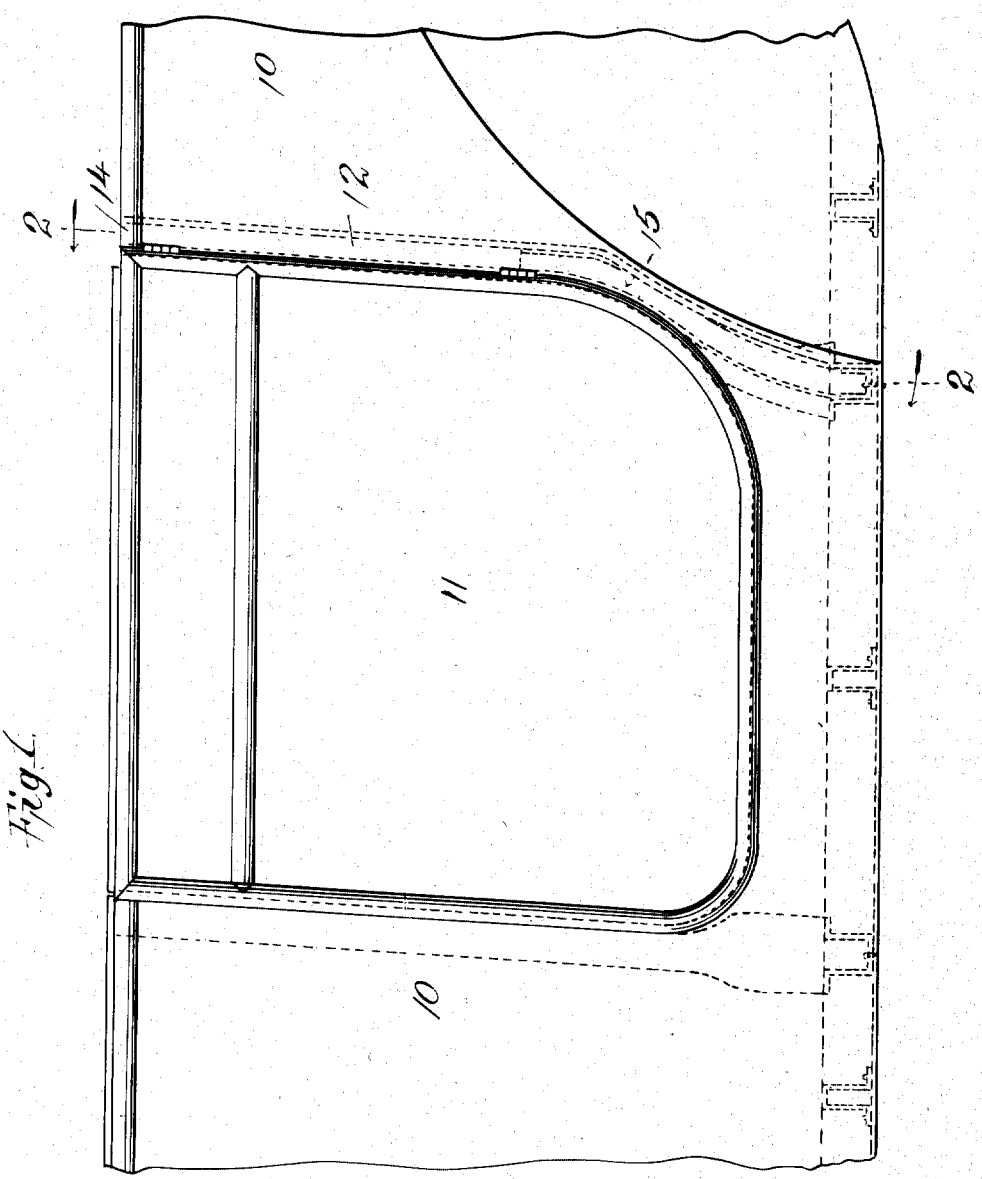

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

RIB FOR AUTOMOBILE-BODIES.

1,251,975.  Specification of Letters Patent.  Patented Jan. 1, 1918.

Application filed February 25, 1913. Serial No. 750,524.

*To all whom it may concern:*

Be it known that I, JOSEPH LEDWINKA, a citizen of the United States, residing at Philadelphia, county of Philadelphia, State of Pennsylvania, have made a certain new and useful Invention in Ribs for Automobile-Bodies, of which the following is a specification.

This invention relates to the construction of automobile bodies, and particularly to the construction and arrangement of strengthening ribs employed in maintaining the shape of the body and maintaining the body rigid.

The object of the invention is to provide a strengthening rib for automobile bodies, which is simple in construction and efficient in operation, and which lends strength and rigidity to the body.

Other objects of the invention will appear more fully hereinafter.

The invention consists in the construction, combination, location, and relative arrangement of parts, all as will be more fully hereinafter set forth as shown in the accompanying drawing and finally pointed out in the appended claim.

Referring to the accompanying drawings and to the various views and reference signs appearing thereon:—

Figure 1, is a broken view, in side elevation, of a portion of an automobile body showing the application thereto of a strengthening rib, in accordance with the principles of my invention.

Fig. 2, is a transverse section of the same on the line 2, 2, Fig. 1, looking in the direction of the arrows.

Fig. 3, is a broken view, in section, on the line 3, 3, Fig. 2, looking in the direction of the arows.

Fig. 4, is a broken view, in section, on the line 4, 4, Fig. 3, looking in the direction of the arrows.

Fig. 5, is a broken detail view, in perspective, showing a portion of a strengthening rib, with a reinforcing member applied thereto.

The same part is designated by the same reference numeral wherever it occurs throughout the several views.

In carrying out my invention I propose to employ a strengthening rib, preferably made of sheet steel pressed into suitable or convenient angular shape in cross section to secure the desired strength and rigidity, and I arrange the same to extend from the upper edge of one side of the body of the automobile, thence down and underneath the floor thereof, thence transversely across the floor, and thence up to the upper edge of the opposite side of the body. This strengthening rib is applied to the exterior surface of the frame of the automobile body but is concealed from view by the application over the same of the outer panel or shell of the body. The strengthening rib may be, as above described, of any suitable angular shape in cross section, but in the form shown, I have provided a strengthening rib formed of sheet metal of substantially U-shape in cross section. My invention, however, is not to be limited or restricted in respect to the particular angular cross sectional shape of the sterngthening rib. I also propose, in accordance with the principles of my invention, to apply to the strengthening rib, a reinforcing portion or member of corresponding angular shape in cross section at the critical points where strains thereon are liable to occur as for instance, at the bends thereof, where passing from the vertical side portions to the horizontal floor portions of the vehicle body.

In accordance with my invention, I also propose to apply the strengthening rib structure embodying the features and characteristics above set forth at any suitable or convenient point in the length of the automobile body, particularly at points adjacent the door opening thereof, or at any other desired points.

Referring particularly to the accompanying drawings; reference numeral 10, designates generally the body of an automobile body of an automobile and 11, the door thereof. The rib is designated by reference numeral 12. This rib is shown as extending from the top edge as indicated at 14, in Fig. 1, of one side of the vehicle body frame, downwardly along said side and thence horizontally underneath the floor level of the body frame, and thence up to the upper edge of the body frame on the opposite side. A strengthening rib constructed and applied as above described affords great strength and rigidity to the body of the automobile. At the critical point of the strengthening rib a reinforcing member may be employed, such for instance, as the channel member 15, shown most clearly in Figs. 2, 3, 4, and 5. In the particular form shown, to which however, my invention is not to be limited, or restricted, this reinforcing member is formed of sheet metal pressed into channel shape so as to conform to the shape of the rib 12. Of course where a rib of any other than channel shape is employed, it will be understood that the reinforcing member will be of similar shape in cross section to conform thereto. Ordinarily, the auxiliary strengthening member will extend only a portion of the way transversely across the bottom of the body plane flooring, and only a portion of the way up the vertical side portion of the rib, as clearly shown in Fig. 2.

Where a continuous one-pieced strengthening rib applied to the body frame of the vehicle, as above described, is employed adjacent to the door opening or doorway in the side of the vehicle frame or body, it will of course, be understood that said rib will be bent into shape to conform to the contour or outline of the doorway opening, as clearly indicated in Fig. 1. In this relation, of course it will be understood that the body rib portion affords convenient means for attaching the hinges of the door thereto.

A continuous one-pieced and strengthening rib constructed and applied as above described, is exceedingly efficient in strengthening the frame of the automobile body and in rendering the same strong and durable. It is preferably formed of sheet steel stamped or pressed into the desired shape, and is capable of being easily applied to the frame or body of the vehicle. The strengthening frame rib 12 is concealed from view by the application thereover of the inner and outer body panels or finishings, the outer panel being indicated at 16.

Having now set forth the object and nature of my invention, and a construction embodying the principles thereof, what I claim as new and useful, and of my own invention, and desire to secure by Letters Patent is:—

In an automobile body, a body frame, a strengthening rib formed of sheet metal pressed into channel shape in cross section and bent into substantially U-shape in the direction of its length, said rib applied to the frame and forming a one piece strengthening member therefor to extend from the top edge of one side of the frame downwardly alongside and transversely across the bottom and thence upwardly to the top edge of the other side of said frame and auxiliary reinforcing members corresponding in cross section to the channel shape of the strengthening rib and fitted into the channel of said rib at the bends thereof, the vertical portions of said rib constituting door posts to receive the hinge connections of the body doors.

In testimony whereof I have hereunto set my hand in the presence of the subscribing witnesses, on this 14th day of February A. D., 1913.

JOSEPH LEDWINKA.

Witnesses:
S. K. THOMPSON,
J. MARMION.